United States Patent [19]
Kato et al.

[11] 4,046,334
[45] Sept. 6, 1977

[54] AUTOMATIC REVERSAL MECHANISM

[75] Inventors: Saburo Kato; Takeshi Takemoto, both of Yokohama, Japan

[73] Assignee: Ricoh Co., Ltd., Japan

[21] Appl. No.: 628,118

[22] Filed: Nov. 3, 1975

[30] Foreign Application Priority Data

Nov. 6, 1974 Japan ............................. 49-127664

[51] Int. Cl.$^2$ .......................... G03B 1/04; B65H 17/02
[52] U.S. Cl. ..................................... 242/201; 242/67.4
[58] Field of Search ...................... 242/67.4, 201, 202; 197/160; 74/354, 202

[56] References Cited

U.S. PATENT DOCUMENTS

| 3,854,670 | 12/1974 | Bertolazzi | 242/67.4 |
| 3,923,267 | 12/1975 | Eckerd | 242/67.4 |

FOREIGN PATENT DOCUMENTS

| 2,054,074 | 6/1971 | Germany | 242/201 |

Primary Examiner—Edward J. McCarthy
Attorney, Agent, or Firm—McGlew and Tuttle

[57] ABSTRACT

The mechanism is for use with a tape recorder of the cassette type in which the direction of rotation of tape reels within a cassette is automatically reversed at the end of taking up the tape. A drive gear is movably supported between a pair of driven gears engageable with the respective reels, so as to be able to engage with either one of the driven gears, and the drive gear is spring biased toward a line connecting the rotating axes of the driven gears. The rotation of the drive gear in one direction causes its engagement with the corresponding driven gear and, at the end of taking up the tape, a substantial displacement of the drive gear against, the spring bias occurs through an increase in load, thereby changing over the direction of rotation of a motor for driving the drive gear. A mechanism is provided for resetting or maintaining the drive mechanism in a given condition which enables the reels to start to rotate in a given direction whenever a tape cassette is removed from the recorder.

8 Claims, 7 Drawing Figures

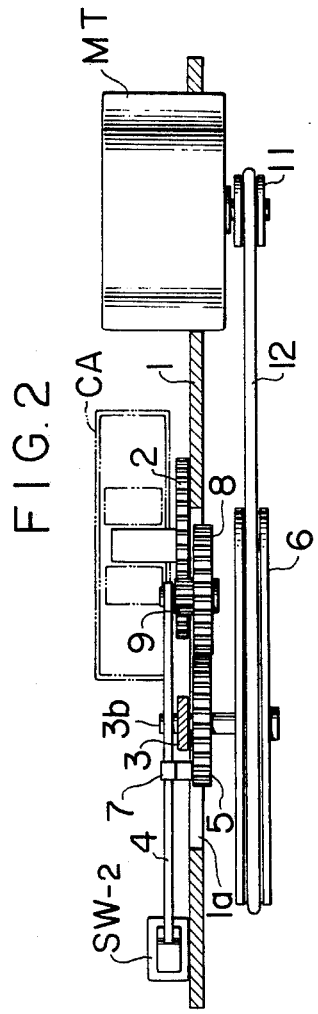

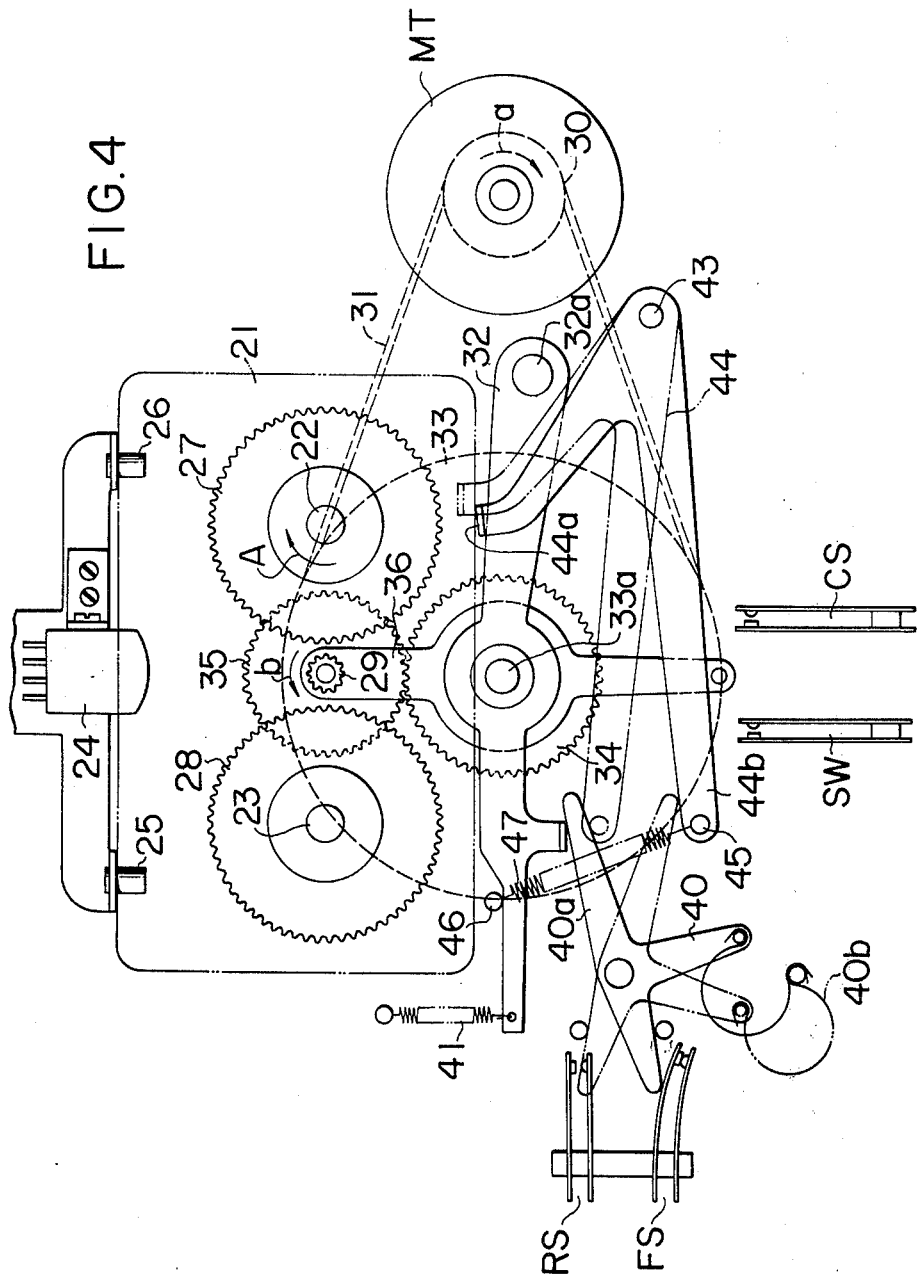

AUTOMATIC REVERSAL MECHANISM

BACKGROUND OF THE INVENTION

The invention relates to an automatic reversal and stop mechanism primarily for use in the tape drive of a tape recorder for automatically reversing the direction of rotation of rotating members and/or stopping such members during their operation.

As is well recognized, a tape recorder is generally provided with drive means which is adapted to drive a capstan roller or tape reel in either the forward or reverse direction, and the drive means internally includes means for starting, stopping, or reversing rotating members. Considering a tape reel drive for a cassette tape recorder, a control mechanism for automatically reversing or stopping rotary members generally comprises means for sensing the tape end in some way, including applying a marking member such as a silver paper to the tape end or previously recording a particular electrical signal thereon. However, a separate provision of sensing means adds to the complexity of the mechanism.

It is also known to detect a sudden increase in the tape tension at the end of taking up the tape. To this end, a sensing member such as a roller or plunger is maintained in sliding contact with a travelling tape so that it may be operated in response to the sudden increase in the tape tension when the tape end is reached, thereby producing a displacement which can be utilized to operate an actuator of a switch, for example. While this results in a substantial simplification of construction, it still requires a space for the provision of elements which are used to detect and utilize the displacement, and additionally, the power dissipation increases also, both of which stand in the way of the miniaturization of the apparatus.

Another problem involved with the tape recorder having such an automatic reversal function is the fact that an operator must confirm whether the tape feed mechanism is in a first condition to feed the tape in a forward direction or in a second condition to feed the tape in the opposite direction when recording is to be commenced. As a matter of practice, it would be convenient if the tape feed mechanism is automatically reset to the first condition to feed the tape in the forward direction when starting the tape recorder.

SUMMARY OF THE INVENTION

It is an object of the invention to eliminate the above-mentioned drawbacks without the provision of a separate member for detecting a tension in the tape, by utilizing a reaction to a transmission member when an increase in the tension occurs, so that the reversal or stopping of the motor switch and a switching action of the transmission member may be directly controlled, thus enabling a miniaturization of the apparatus.

It is another object of the invention to provide an automatic reversal mechanism which resets a tape feed mechanism into a first condition to feed the tape in a given direction, for example, in a forward direction, whenever a tape cassette is removed from its receiving chamber of a tape recorder.

BRIEF DESCRIPTION OF THE DRAWINGS

FIG. 2 is a side elevation view;

FIG. 4 is a plan view of another embodiment of the invention in which the reset mechanism according to the invention is incorporated;

FIG. 5 is a side elevation view of the embodiment shown in FIG. 4;

DETAILED DESCRIPTION OF EMBODIMENT

Figure 1:
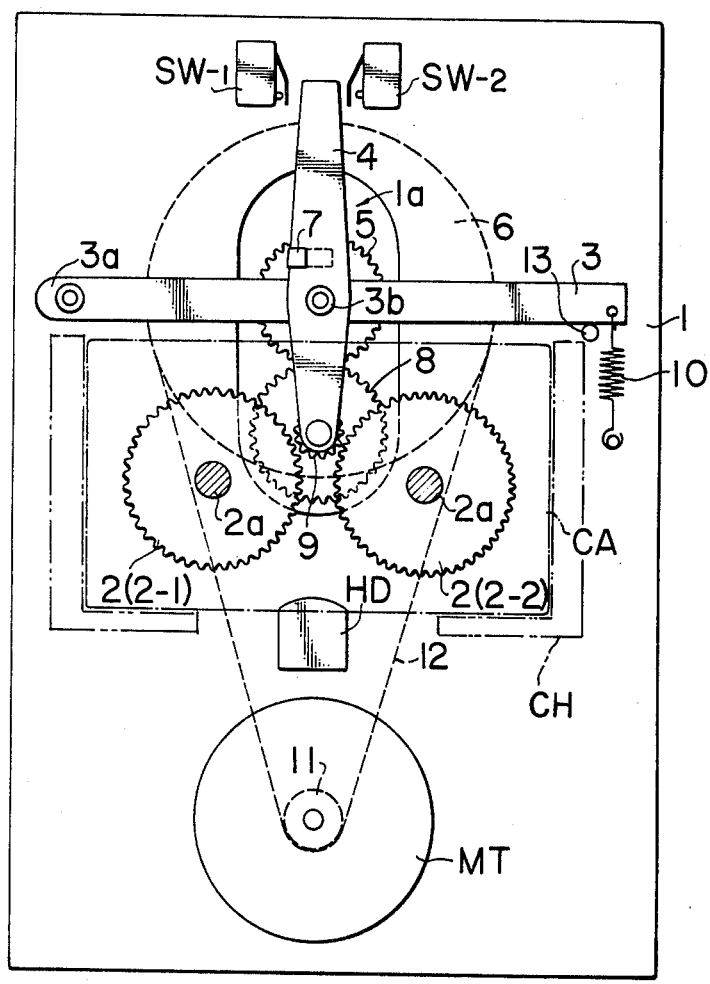
FIG. 1 is a plan view of the automatic reversal and stop mechanism constructed in accordance with one embodiment of the invention.

Referring to FIGS. 1 and 2, there is shown a drive means of a cassette tape recorder which incorporates the automatic reversal and stop mechanism according to the invention. The apparatus includes a base 1 on which a pair of driven gears 2 (2-1, 2-2) are rotatably mounted, and have associated shafts 2a on which the hubs of a pair of spaced reels, which are housed within a cassette CA, received in a chamber CH are fitted. An oscillating arm 3 is mounted at 3a on the base 1 and extends horizontally over the base 1 adjacent to the driven gears 2. In addition, a motor MT, switches SW-1, SW-2, and sensor HD are disposed on the base 1, which is also centrally formed with a slot 1a for receiving other members.

Most of the members used in the drive mechanism other than the above-mentioned members are supported on a shaft 3b which is fixedly mounted on the oscillating arm 3 substantially at a middle position thereof so as to be in suspension with respect to the base 1. The free end of the oscillating arm 3 is urged by a tension spring 10 toward the driven gears 2, and bears against a stop 13. An actuating arm 4 is pivotally mounted on the shaft 3b above the oscillating arm, while a rotary member, having a drive gear 5 and a flywheel 6 integrally formed therewith, is pivotally mounted thereon below the oscillating arm. Toward the middle of the actuating arm 4, one end of a spring piece 7 is secured to the arm 4 and has its other end maintained in edgewise sliding contact with the upper surface of the drive gear 5, thus maintaining the arm 4 and the gear 5 in engagement with each other through the friction of the spring piece 7. The end of the actuating arm 4 which is located nearer the driven gears 2 has a rotary member pivotally mounted thereon, which rotary member is integrally formed with a planetary gear 8 and a transmission gear 9, the planetary gear 8 meshing with the drive gear 5. The transmission gear 9 is maintained at the same elevation as the driven gears 2, so that the transmission gear 9 selectively meshes with either driven gear 2 as the actuating arm 4 oscillates. The opposite end of the actuating arm 4 is located in the space between the pair of switches SW-1, SW-2, and operates either one of these switches when the transmission gear assume an extreme position in which it meshes with either one of the driven gears 2. The flywheel 6 is peripherally formed with a belt receiving groove, which is engaged by a flexible belt 12 running around a drive pulley 11 on the output shaft of the motor MT. In this manner, the flywheel 6 serves the dual function of transmitting and smoothing the rotation.

Figure 3A:
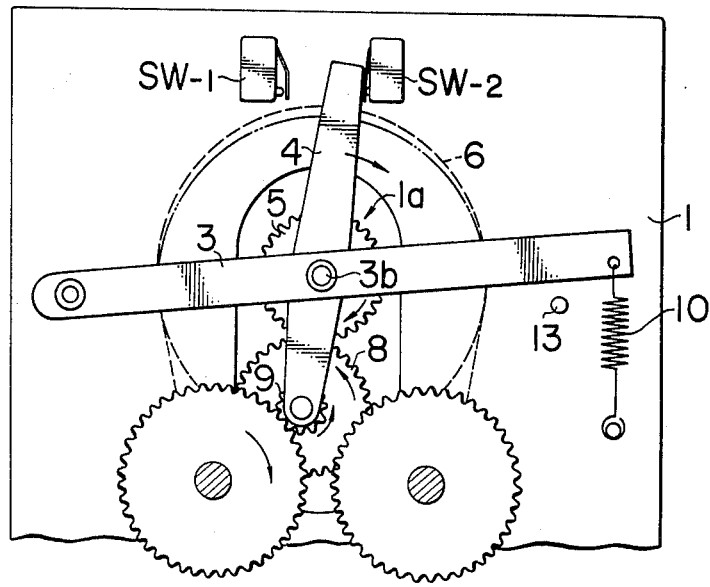
FIGS. 3a and 3b are schematic plan views illustrating the operation of the mechanism shown in FIG. 1.
Figure 3B:
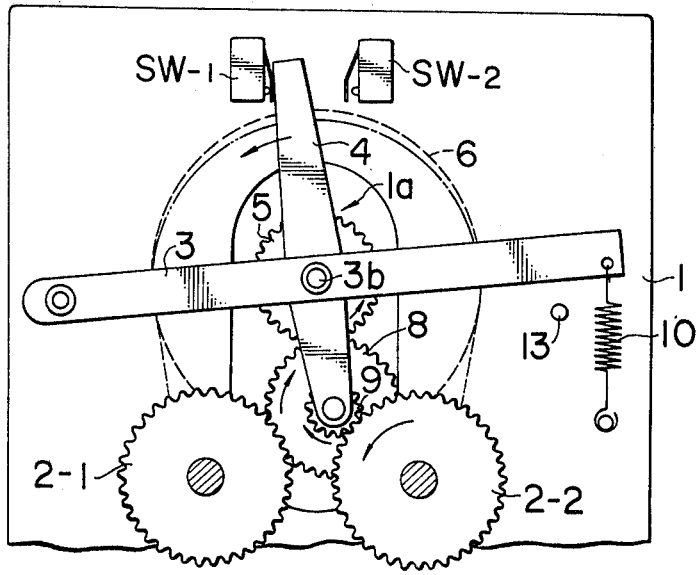

Referring to FIG. 1 and FIGS. 3a and 3b, the operation of the automatic reversal and stop mechanism will be described. The drive gear 5 is driven through the belt 12 from the pulley 11 of the motor MT, and thus rotates whenever the motor MT is energized. If the drive gear 5 rotates clockwise (hereinafter abbreviated as CW), as viewed in these Figures, from the neutral condition shown in FIG. 1, the planetary gear 8 meshing therewith will rotate in the counterclockwise direction (hereinafter abbreviated as CCW), and simultaneously the actuating arm 4 will rock in the CW direction by friction of the spring piece 7 against drive gear 5.

When the transmission gear 9 meshes with the left-hand driven gear 2-1, it is subjected to a reaction of the load torque, whereby it causes the oscillating arm 3 to be rocked in the CCW direction. Thereafter, the transmission gear 9 assumes and remains in a meshing position in which the reaction is balanced with the sum of the forces of compression applied by the tension spring 10 and the belt 12, and subsequently permits the driven gear 2-1 to rotate in the CW direction, thus taking up the tape on the left-hand reel. When the tape is entirely taken up on the left-hand reel, there occurs a sudden increase in the load since the tape end is secured to the reel. As a result, the above meshing position is shifted to the left, as viewed in the drawings, whereby the actuating arm 4 is further rocked in the CW direction until the remote end of the actuating arm 4 operates the right-hand reversing switch SW-2 to cause a reversal of the motor MT (see FIG. 3a).

Thereupon, the drive gear 5 is reversed to rotate in the CCW direction, whereupon the force of friction applied by the spring piece, and a change in the direction of load as well as the forces of compression applied by the spring 10 and the belt 12 cooperate together to cause a rapid rocking motion of the actuating arm 4 in the CCW direction and, as it rocks, the oscillating arm 3 is also rocked in the CW direction to bear against the stop 13, thereby returning to the neutral position. Subsequently, an operation as described above is repeated until the transmission gear 9 meshes with the right-hand driven gear 2—2 (see FIG. 3b). When the tape is entirely taken up on the right-hand reel, the left-hand switch SW-1 is now operated to stop the motor.

If the switch SW-1 is connected in a motor reversal controlling circuit which is similar to that used with the right-hand switch SW-2, the motor will be reversed again, thus repeating the reversal as many times as desired during the operation of the apparatus.

In the above-mentioned embodiment, the gears which have been used for transmission between rotating members may be replaced by rubber wheels having a sufficiently large coefficient of friction. In addition, the angle between the line joining the axes of the driven gears 2 and the transmission gear 9 and the actuating arm 4 may be increased.

Another embodiment which incorporates the reset mechanism initially referred to will now be described. Referring to FIGS. 4 and 5, there is shown a tape cassette 21 including a pair of reel drive shafts 22, 23, and a magnetic head is shown at 24. The tape cassette 21 is located in a cassette receiving chamber of a tape recorder, such as shown at CH in FIG. 1, by means of positioning members 25, 26. A pair of drive gears 27, 28 are fixedly mounted on the pair of drive shafts 22, 23, and are selectively engaged by a pinion 29 located therebetween. If now a pulley 30 associated with a drive motor M rotates in the direction indicated by an arrow a shown in FIG. 4, the rotation is transmitted through a belt 31 to a flywheel 33 which is rotatably mounted on a shaft 33a fixedly mounted on an oscillating arm 32 which is in turn pivotally mounted at 32a. A transmission gear 34, which is integral and concentric with the flywheel, rotates, whereby an idler 35 meshing therewith rotates in the direction indicated by an arrow b shown in FIG. 4. The idler 35 is integral and concentric with the pinion 29 and has its shaft rotatably mounted on one end of a feed direction selecting lever 36 which is in turn rockably fitted on the shaft 33a of the flywheel 33. The selection lever 36 is maintained in frictional engagement with the transmission gear 34 through a leaf spring or other means, not shown. Consequently, as the transmission gear 34 rotates in the direction of the arrow a as viewed in FIG. 4, the selecting lever 36 rocks in the same direction, whereby the pinion 29 rotatably mounted on one end thereof, moves into meshing engagement with the drive gear 27. When the drive motor M rotates in the opposite direction from that indicated by the arrow a shown in FIG. 4, the selecting lever 36 rocks in the opposite direction, whereby the pinion 29 moves into meshing engagement with the other drive gear 28. In the following description, the meshing engagement with the drive gear 27 will be referred to as a first condition which feeds the tape in the forward direction, and the meshing engagement with the drive gear 28 as a second condition which feeds the tape in the opposite direction.

The direction of rotation of the drive motor M is changed in accordance with the position of a three-arm member 40 which functions in switching the tape feed. Specifically, when the switching member 40 assumes the position shown in solid line in FIG. 4, a forward rotation switch FS is closed to drive the motor M in the direction of the arrow a, whereby the tape feed mechanism is in its first condition. When the switching member 40 assumes a position indicated in phantom lines in FIG. 4, a reverse rotation switch RS is closed, causing the tape feed mechanism to assume the second condition.

Assume that the tape feed mechanism is in its first condition and the tape drive shaft 22 is rotating in the direction of an arrow A in FIG. 4. When the tape feed within the tape cassette 21 is terminated in the forward direction, the other tape drive shaft 23 ceases to rotate, whereby the drive gear 27 ceases to rotate. Then the pinion 29 meshing with the drive gear 27 turns around the periphery of the latter, causing the selecting lever 36 to rock in the clockwise direction, as viewed in FIG. 4, whereby the oscillating arm 32 is moved counterclockwise, as viewed in FIG. 4, against the resilience of a spring 41 which is engaged with the free end thereof. This rotation of oscillating arm 32 causes a displacement of the free arm member 40 from the position shown in solid line to the position shown in phantom lines with the aid of a toggle spring 40b which is attached to one arm thereof, thus opening the forward rotation switch FS and closing the reverse rotation switch RS. Thereupon, the drive motor M begins to rotate in the reverse direction, and at the same time the oscillation of the selecting lever 36 closes a channel changing switch SW associated with the magnetic head 24, whereby a recording or playback track on the tape is changed and the tape feed mechanism is automatically changed from the first to its second condition. When the tape feed is completed in the second condition, the selecting lever 36 rocks counterclockwise as viewed in FIG. 4, closing a stop switch CS to interrupt the rotation of the drive motor M.

The reset mechanism will now be described with reference to FIG. 4. A tape recorder, not shown, includes a base plate 42 (see FIG. 5) in which a shaft 43 is fixedly mounted, and a fork member 44 has its base portion pivotally mounted on the shaft 43. The end 44a of one arm of the fork member 44 is bent into L-configuration which is disposed to project into a chamber (not shown) which is formed for receiving the tape cassette 21. A pin 45 is fixedly mounted on the end 44b of another arm of the fork member 44, and is disposed on a path of rocking motion of the arm 40a of the switching member 40. A compression spring 47 extends between the pin 45 and a stationary pin 46 which is fixedly mounted on the base plate 42, thus urging the fork member 44 in a direction which causes the end 44a to project into the cassette receiving chamber. With the reset mechanism described, when the tape cassette 21 is loaded into the receiving chamber, the fork member 44 is rocked by one lateral edge of the tape cassette 21 in the counterclockwise direction, as viewed in FIG. 4, against the resilience of the spring 47, thus moving the pin 45 out of the path of rocking motion of the arm 40a of the switching member 40, as shown in solid line in FIG. 4. However, when the tape cassette 21 is removed from its receiving chamber, the fork member 44 rotates clockwise under the bias applied thereto, and the pin 45 moves to the position shown in solid line in FIG. 4. As a consequence, when a recording on a fresh tape is to be commenced, the tape feed will always start from the first condition, irrespective of whether the tape feed mechanism assumes the first or the second condition. This avoids the trouble of recognizing the direction of tape feed when starting a tape recorder.

Figure 6:
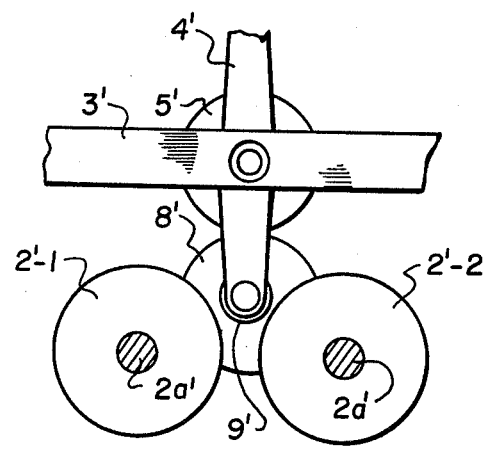
FIG. 6 is a plan partial view of another embodiment of the invention.

FIG. 6 shows an embodiment of the invention which utilizes friction wheels instead of gears. In this embodiment like parts are indicated as having the same numerals as those of the embodiment of FIG. 1, with primes.

While, in the above embodiment, the switching member 40 is urged to its home position in accordance with the presence or absence of the tape cassette, it should be understood that the switching member 40 may be displaced to the home position by an interlocking connection with an eject lever which is usually provided on a tape recorder.

What is claimed is:

1. An automatic reversal mechanism comprising, in combination,
   a. a pair of rotatable driven members disposed in a common plane with their axes parallel to each other each;
   b. a rotatable drive member movable between said driven members and in a direction perpendicular to a line connecting their axes, to peripherally engage either driven member to transmit a driving force thereto;
   c. reversible drive means connected to said drive member to rotate said drive member in a selected direction;
   d. means operable, in accordance with the direction of rotation of said drive member, to move said drive member into peripheral driving engagement with a respective one of said driven member;
   e. means biasing said drive member toward said connecting line; said driving member responsive to the reaction force exerted thereon by the then-engaged driven member, moving away from said connecting line against the force of said biasing means until such reaction force biases the force of said biasing means; said drive member, responsive to an increase in such reaction force beyond a predetermined value, due to an increased load on the then-engaged driven member, being displaced further from said connection line;
   f. switching means operative, responsive to such further displacement of said drive member, controlling said drive means to interrupt rotation of said drive member in its then effective direction of rotation.

2. A mechanism according to claim 1 wherein said driven and drive members are gears.

3. A mechanism according to claim 1 wherein said driven and drive members are friction wheels.

4. A mechanism according to claim 1 wherein said drive member is supported on one end of a swingable arm which is in turn pivoted on a free end portion of an oscillating arm, and said resilient means comprises a coil spring having one end connected to the free end of said oscillating arm and the other end connected to an immovable member.

5. An automatic reversal mechanism comprising:
   a. a pair of rotatable driven members disposed in a plane and having their axes arranged parallel to each other,
   b. a rotatable drive member movable between said pair of driven members and in a direction perpendicular to a line connecting said axes to peripherally engage either one of said driven members so as to transmit drive thereto,
   c. reversible drive source means for rotating said drive member in a selected direction,
   d. means for moving said drive member into peripheral engagement with either one of said driven members in accordance with the direction of rotation of said drive member,
   e. resilient means urging said drive member toward said connecting line, and
   f. switching means operative in response to the displacement of said drive member against the action of said resilient means beyond a predetermined value for controlling said drive source means to cause the reversal or stopping of rotation of said drive member; said drive member being supported on one end of a swingable arm which is in turn pivoted on a free end portion of an oscillating arm, and said resilient means comprising a coil spring having one end connected to the free end of said oscillating arm and the other end connected to an immovable member.

6. A mechanism according to claim 5 wherein said drive source means comprises a reversible electric motor, and said switch means comprises at least one electric switch adapted to be actuated by the other end of said swingable arm.

7. A tape recording and reproducing apparatus of cassette type comprising;
   a. a chamber for receiving therein a tape cassette having a pair of tape reels,
   b. a pair of rotatable driven members engageable with respective said reels when the cassette is received in said chamber,
   c. a rotatable drive member movable between said pair of driven members and in a direction perpendicular to a line connecting their axes to peripherally engage either one of said driven members so as to transmit drive thereto,
   d. reversible drive source means for rotating said drive member in a selected direction,
   e. means for moving said drive member into peripheral engagement with either one of said driven members in accordance with the direction of rotation of said drive member, f. resilient means for urging said drive member toward said connecting line, g. switching means operative in response to the displacement of said drive member against the action of said resilient means beyond a predetermined value for controlling said drive source means to assume at least two conditions in which said drive member rotates in respective opposite directions, h. means detecting the absence of a tape cassette within said chamber and operating said switching means to cause said drive source means to assume a given one of said two conditions.

8. An apparatus according to claim 7 wherein said detecting means comprises a lever having one end thereof projecting into said chamber, and said operating means comprises a swingable arm adapted to be actuated by the other end of said lever.

* * * * *